Oct. 20, 1953  S. R. HART  2,655,856
AIR CONDITIONER FOR MOTOR VEHICLES
Filed Jan. 25, 1949  2 Sheets-Sheet 1
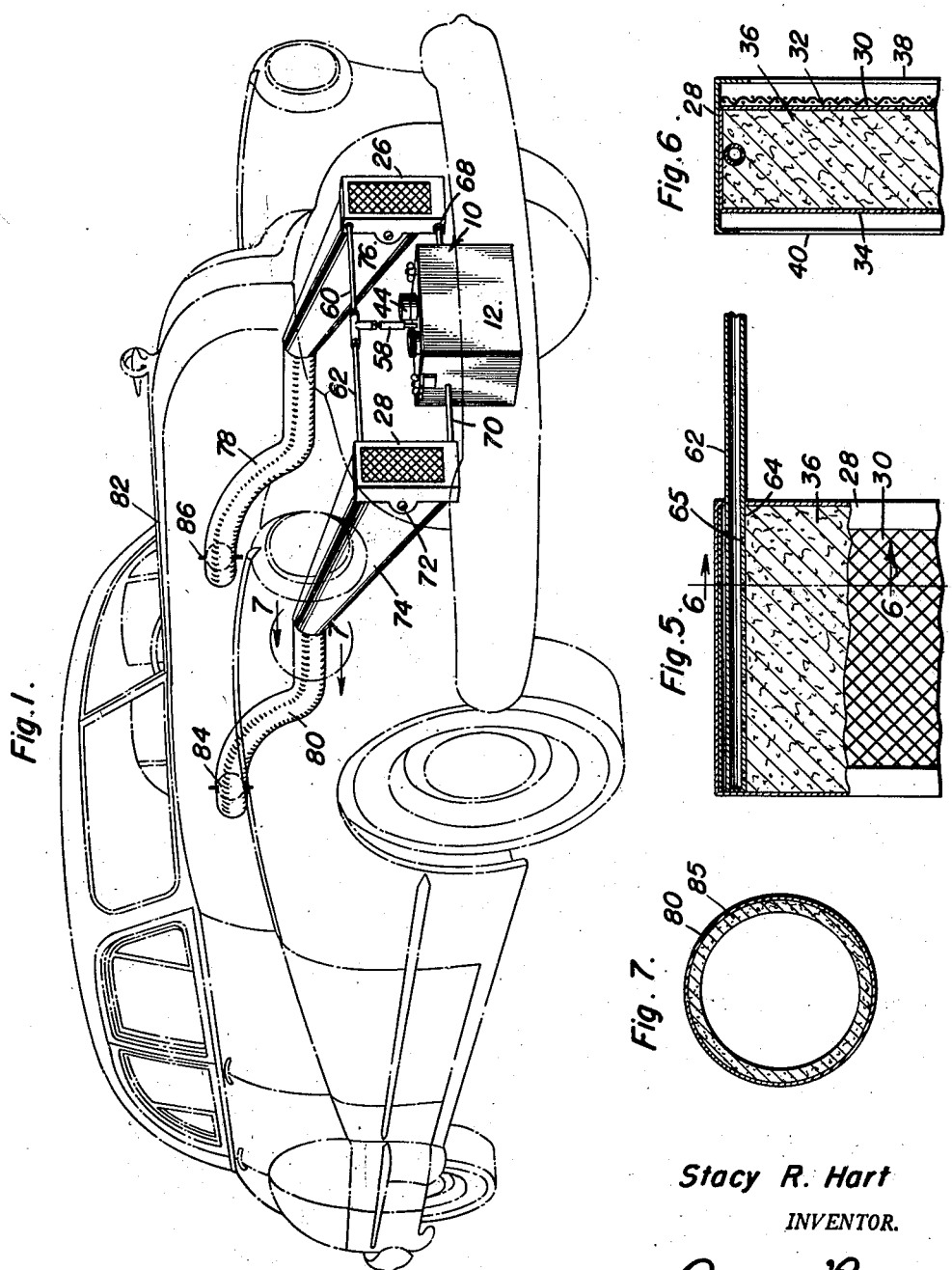
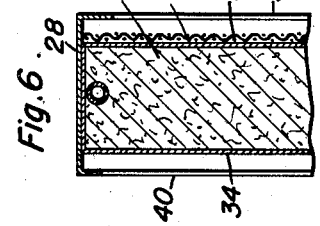
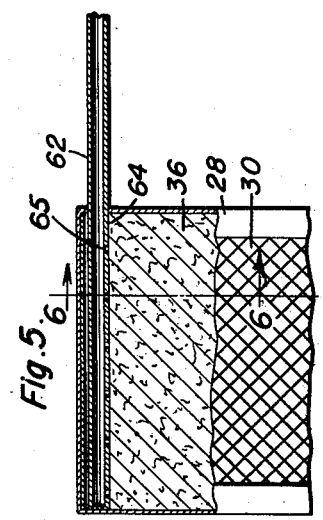
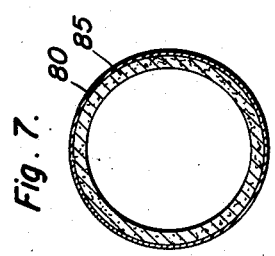
Stacy R. Hart
INVENTOR.
BY Oct. 20, 1953     S. R. HART     2,655,856
AIR CONDITIONER FOR MOTOR VEHICLES
Filed Jan. 25, 1949     2 Sheets-Sheet 2
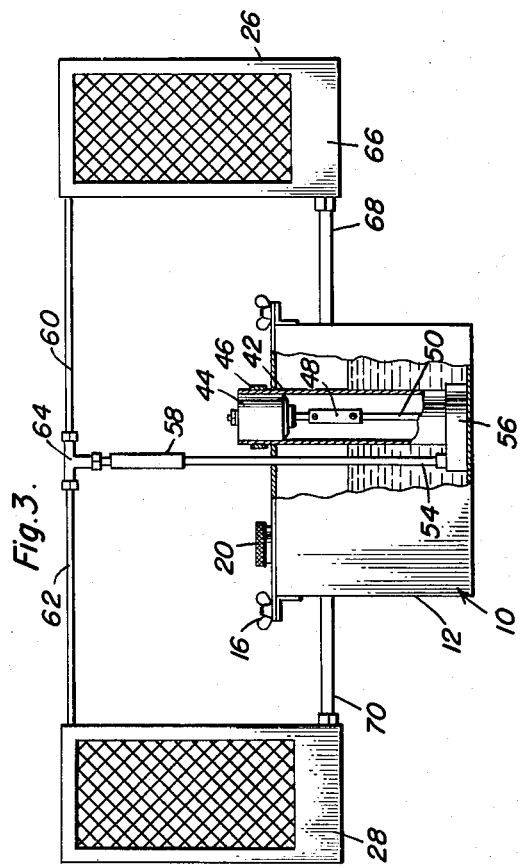
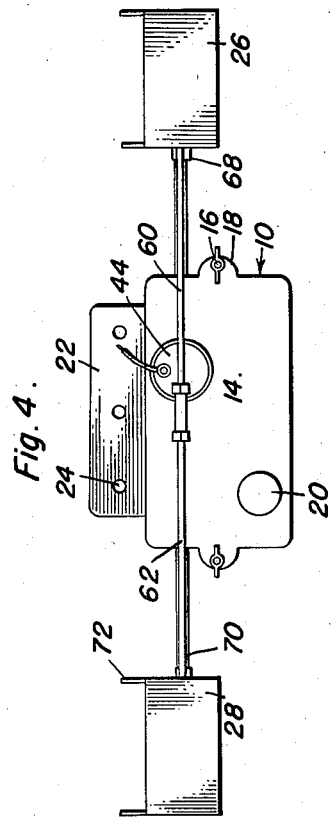
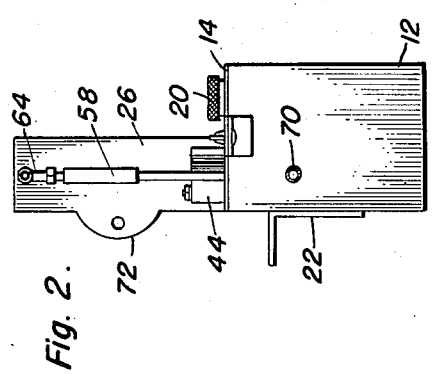
Stacy R. Hart
INVENTOR.

Patented Oct. 20, 1953

2,655,856

UNITED STATES PATENT OFFICE 2,655,856

AIR CONDITIONER FOR MOTOR VEHICLES

Stacy R. Hart, Littlefield, Tex., assignor of ten per cent to Robert L. Kirk, Littlefield, Tex.

Application January 25, 1949, Serial No. 72,566

2 Claims. (Cl. 98—2)

This invention relates to an improved air conditioner for motor vehicles of the closed body type and has for its primary object to supply cool clean air to the interior of the body or passenger compartment in warm weather.

A further important object of this invention is to provide an air conditioner for automobiles, which operates independently of the radiator and which does not interfere with the temperature of the motor but which will circulate a supply of cool air to the interior of the automobile body.

And yet another important object of this invention resides in the provision of an air conditioning device for automobiles, which may be readily and easily mounted for use on any standard type of automobile, which is comparatively simple in construction and which is durably and sturdily constructed.

The present invention contemplates the provision of a housing secured to the automobile, adjacent the front end thereof and adapted to be supported behind the grill work. Housings, having absorbent material disposed therein, are associated with the casing and disposed on the opposing sides thereof. Means is provided for continuously supplying water to the absorbent material in order to maintain the same in a saturated condition for moistening and cooling the air passing therethrough. Conduits are associated at one end with the housings and at their opposing ends with the dashboard of the vehicle, so that the cooled air passing through the saturated material in the housings is conducted to the interior of the automobile body. The air flowing through the conduits and through the outlet openings thereof at the dashboard is cooled due to its passage through the saturated material and, of course, the amount of air is dependent upon the speed of travel of the automobile. Control means is disposed in the conduits for adjusting the supply of air into the vehicle body and for closing the air inlet openings at the dashboard, if desired.

These and ancillary objects and structural features of merit are attained by this invention, a preferred embodiment of which is set forth in the following description and illustrated in the accompanying drawings, wherein:

Figure 1 is a perspective view of a standard automobile, showing the same equipped with an air conditioning apparatus constructed in accordance with the present invention, the apparatus being shown in perspective;

Figure 2 is a side elevational view of the apparatus;

Figure 3 is a front elevational view thereof, with a portion of the water retaining receptacle or casing broken away to illustrate the means provided for supplying water to the housing disposed on the opposite side of the casing;

Figure 4 is a top plan view of the apparatus, shown in Figures 1 and 3;

Figure 5 is an enlarged vertical sectional view, taken through one of the housings;

Figure 6 is an enlarged sectional view taken on line 6—6 of Figure 5 and looking in the direction of the arrows, and, Figure 7 is a transverse sectional view taken substantially on line 7—7 of Figure 1.

Referring now more particularly to the drawings, this invention generally designated by the character reference 10 includes a casing or receptacle 12, which is provided for retaining a supply of water or other suitable fluid. A closure lid 14 is detachably secured to the open top of the casing by fastening means 16 disposed through the complementary offset ears 18 formed on the ends of the end walls of the casing and the ends of the closure lid. A filling cap 20 is threadingly engaged in the closure lid and is provided, so that the water supply in the casing may be replenished, without necessitating the removal of the closure lid.

Means are provided for securing the casing to the front of the motor vehicle, immediately behind the grill, and comprises an angle iron 22, having the vertical portion thereof secured to the rearward side of the casing, with the horizontal portion of the angle member projecting rearwardly from the casing and formed with a plurality of attaching openings 24, whereby the same may be bolted to a suitable projection, adjacent the motor.

Housings 26 and 28 are disposed at the opposing ends of the casing and are formed in an identical manner. Thus, with respect to Figures 5 and 6, it is to be noted that the housing comprises an inner compartment 30 defined by vertically disposed wire guards 32 and 34, the wire guard 32 being reinforced. Absorbent material, 36, such as excelsior pads or the like is stuffed between the opposing foraminous vertical partitions 32 and 34. The latter are spaced inwardly from the open front 38 and open back 40 of the housings.

Means are provided for pumping the water from the tank or casing 12 and discharging it onto the absorbent material 36, disposed in both of the housings 28 and 26, so that the same is properly saturated for humidifying and cooling the air passing therethrough into the interior of the automobile body.

Thus, a pump housing 42 is vertically disposed in the tank or casing 12 and extends outwardly therefrom to receive and support a standard electric motor 44. The latter is secured within the upper end of the pump housing by means of an annular band or clamp 46 concentrically disposed about the housing. A coupling 48 connects the drive shaft of the motor 44 with the pump 50 for operating the latter. A pump stem 54 extends upwardly from the base 56 of the pump housing 42 and is connected at its upper end to a coupling hose or sleeve 58. The coupling sleeve 58 is associated with horizontally disposed tubes 60 and 62 by means of a T-coupling 64. The tubes 60 and 62 extend through the upper ends of the housings 26 and 28 and the inner ends thereof are perforated as at 65, whereby the water conveyed through the tubes 60 and 62 into the housing is allowed to pass through the absorbent material 36. Sumps or reservoirs 66 are formed in the lower ends of the housings and drain tubes 68 and 70 horizontally extend therefrom and are secured at their opposing ends within the tank or casing 12, whereby the water gravitating through the absorbent material is conveyed back to the tank.

Thus, the excess water will be caught in the sumps or reservoirs 66 and returned to the tank or casing 12 through the drain tubes or pipes 68 and 70.

When the air conditioning apparatus, thus far described, is attached to an automobile to supply cool air to the interior of the body, the tank and the opposing housings are secured to the front of the vehicle, as seen in Figure 1. The tank is mounted on the vehicle by means of the attaching member 22 and the housing 28 and 26 are formed with rearwardly directed lateral ears 72, whereby the same may be secured to conical shaped ducts 74 and 76. Flexible conduits 78 and 80 are secured to the inner minor ends of the ducts and the conduits are provided with insulation 85, to prevent the cool air passing through the conditioner housings 26 and 28 and the ducts 74 and 76 from coming in contact with any of the heated metal or parts of the car which have become heated by reason of their proximity with the motor.

The inner ends of the conduits are secured in a conventional manner to the dashboard of the motor vehicle 82 and are provided with dampers or valves 84 and 86 for controlling the flow of the air from the conduits into the passenger compartment or interior of the body.

It can be seen that, when the vehicle travels along, the air rushing against the front of the vehicle will be conveyed through the conditioner housings 26 and 28 into the interior of the body. Due to the contact of the air with the saturated material in the housings, the air will be cooled and cleaned, so that cool filtered air will be conveyed through the ducts and conduits into the interior of the automobile.

Thus, it can be seen that there is provided a very simple and efficient apparatus, which may be conveniently and easily assembled on any standard make of vehicle for the purpose intended.

However, while one embodiment of this invention has been shown, it is to be understood that certain other embodiments can be carried out, as coming within the spirit and scope of the appended claims.

Having described the invention, what is claimed as new is:

1. In a vehicle, an air conditioning unit, said unit comprising a tank including means for detachably securing the same on the front of the vehicle, a pair of liquid retaining housing members each having forward and rear walls, each of said forward and rear walls having an elongated opening therein, an absorbent material in each of said housing members adapted to receive liquid, a pump unit supported by said tank for impelling water into the housing members and including an outlet, a vertical conduit extending upwardly from the tank and having a lower end connected to the outlet of said pump unit, said housing members below said openings being imperforate and forming sumps, a pair of horizontal conduits connected at their ends to the sump forming portions of said housing members and to the tank well above the bottom wall of said tank, whereby an excess amount of water collected by said housing members may drain back into said tank, an upper pair of horizontal conduits connected at their ends to the upper end of said vertical conduit and to the upper portions of said housing members, said horizontal and vertical conduits constituting means supporting said housing members relative to said tank, and a pair of elongated side by side conduits extending rearwardly from said housing members and into the interior of the vehicle and having forward ends removably secured to the housing members in registry with the openings in the rear walls of the housing members.

2. In a vehicle, an air conditioning unit, said unit comprising a tank including means for detachably securing the same on the front of the vehicle, a pair of open ended liquid retaining housing members, an absorbent material in each of said housing members adapted to receive liquid, a pump unit supported in said tank for impelling water into the housing members and including an outlet, a vertical conduit extending upwardly from the tank and having a lower end connected to the outlet of said pump unit, the bottom of said housing members being imperforate and provided with a sump forming portion, a pair of horizontal conduits connected at their ends to the sump forming portions of said housing members and to the tank above the bottom wall of said tank, whereby an excess amount of water collected by said housing members may drain back into said tank, an upper pair of horizontal conduits connected at their ends to the upper end of said vertical conduit and to the upper portions of said housing members, and extending into the housing members to a point adjacent the absorbent material, said horizontal and vertical conduits constituting means supporting said housing members relative to said tank, and a pair of elongated side by side conduits extending rearwardly from said housing members and into the interior of the vehicle and having forward ends removably secured to the housing members.

STACY R. HART.

References Cited in the file of this patent

UNITED STATES PATENTS

| Number | Name | Date |
| --- | --- | --- |
| 1,875,637 | Modine | Sept. 6, 1932 |
| 1,938,559 | Hueber | Dec. 5, 1933 |
| 2,237,497 | Munford | Apr. 8, 1941 |
| 2,277,552 | Kneedler | Mar. 24, 1942 |
| 2,285,725 | Kneedler | June 9, 1942 |
| 2,391,408 | Galamb et al. | Dec. 25, 1945 |

FOREIGN PATENTS

| Number | Country | Date |
| --- | --- | --- |
| 670,408 | Germany | Jan. 18, 1939 |
| 529,827 | Great Britain | Nov. 28, 1940 |